United States Patent Office 3,732,093
Patented May 8, 1973

3,732,093
PROCESS FOR THE PREPARATION OF CAESIUM METAL
Christian Vaniscotte, Vermelles, France, assignor to Houilleres du Bassin du Nord & du Pas-de-Calais, Douai, France
No Drawing. Filed Nov. 30, 1967, Ser. No. 686,847
Claims priority, application France, Dec. 2, 1966, 86,039
Int. Cl. C22b 27/00
U.S. Cl. 75—66                                    6 Claims

ABSTRACT OF THE DISCLOSURE

This invention is concerned with a process for the preparation of caesium metal wherein an ore containing caesium is directly reacted with silicon in the presence of a sufficient quantity of lime at 1300° C. to yield the pure metal.

---

Caesium is found in the combined state in certain rocks, most commonly in the form of silico-aluminates known as "pollucites"; these rocks can contain up to 20–35% of caesium oxide. The methods employed hitherto for obtaining caesium in the pure state comprise two stages: (i) solubilisation of the elements and precipitation of a caesium salt and (ii) extraction of caesium metal from the salt thus obtained.

The second stage has been effected by various methods, one group being based on the electrolysis of a molten bath of caesium and barium cyanide, and another group on direct reduction of the salt, at high temperatures, by various metals such as magnesium, aluminum, calcium or zirconium. However both these methods are subject to disadvantages; the electrolytic method generally gives poor yields of the pure metal and the direct reduction method gives products which are contaminated with the reductant metal.

I have now developed a process whereby pure metallic caesium can be obtained in yields greater than 90%; this process is based on the direct reaction at a temperature of about 1300° C. of pollucite with silicon in the presence of a sufficient quantity of lime (CaO). This process can be represented by the following chemical equations in which M represents the alkali metal or metals other than caesium present in the pollucite starting material:

(1) $2Cs_2O + Si + 2CaO \rightarrow 4Cs + SiO_2 \cdot 2CaO$ (2) $2M_2O + Si + 2CaO \rightarrow 4M + SiO_2 \cdot 2CaO$ (3) $Al_2O_3 \rightarrow Al_2O_3$ (4) $2H_2O + Si + 2CaO \rightarrow 2H_2 + SiO_2 \cdot 2CaO$ (5) $SiO_2 + 2CaO \rightarrow SiO_2 \cdot 2CaO$ The hydrogen arising from Reaction 4 is liberated at about 400° C. and is removed from the reaction zone in order to avoid the formation of alkali metal hydrides.

The various factors which affect the reduction reaction according to the invention are as follows:

(a) Quantity of silicon used: this quantity must be in excess of the stoichiometric quantities required by the above Reactions 1 and 2.

With an amount of silicon equal to the required stoichiometric quantity, the overall yield of the reaction is only about 85%; the yield increases with the excess of silicon until this excess corresponds to about 50% with respect to the stoichiometric quantity. This phenomenon is probably due to the heterogeneous character of the reaction and the moisture content of the starting materials so that the excess of silicon which gives the optimum yield may vary slightly according to the experimental conditions.

(b) Quantity of lime to be added: an insufficient amount of lime leads to poor yields of caesium; in order to obtain good yields, it is necessary to use at least two moles of lime per mole of silica present in the reaction mixture. This silica comprises both that which is present in the mineral starting material and that which is formed in the course of the reaction.

(c) Reaction temperature: the temperature of the reaction has a considerable influence on the reaction rate and, accordingly, on the yield obtained in a given reaction time. Thus for a particular set of reaction parameters, at 1200° C. the yield of caesium is 73% at the end of 1 hour of reaction and is 88% at the end of 2 hours; at 1300° C., under otherwise identical conditions, the yield is 90% at the end of 1 hour of reaction. It is therefore preferable to use temperatures higher than 1200° C., in particular temperautres in the range 1300° to 1400° C.

(d) Moisture content of reactants: under the experimental conditions used, water is reduced by silicon according to Equation 4 above. In order to avoid this consumption of silicon, it is therefore desirable to use anhydrous starting materials; but when the use of anhydrous reactants is not convenient, an excess of silicon must be used.

(e) Atmosphere in which the reaction is effected; the atmosphere over the reacting substances has an influence on the yield of the reaction and the purity of the products obtained; the atmosphere should be inert with respect to all the reactants and it is preferred to sweep the reactor continuously throughout the duration of the reaction with an inert gas, such as nitrogen or argon.

The alkali metals prepared by the process according to the invention are obtained in vapour form and are preferably fractionally condensed on leaving the reactor to obtain the pure metals and in particular, caesium having a purity of at least 98%.

The following examples are given by way of illustration only. In these examples, the starting material was a pollucite having the following composition:

|  | Mole/100 g. of pollucite | | Weight/100 g. pollucite |
|---|---|---|---|
| $SiO_2$ | 0.830 | | 49.8 |
| $Al_2O_3$ | 0.177 | | 18.05 |
| $Na_2O$ | 0.045 | | 2.79 |
| $K_2O$ | 0.003 | $M_2O = 0.091$ | 0.28 |
| $Li_2O$ | 0.043 | | 1.3 |
| $Cs_2O$ | 0.083 | | 23.4 |
| $CaO$ | Negligible | | 0.8 |
| $Fe_2O_3$ | Negligible | | 0.8 |
| $H_2O$ | 0.150 | | 2.70 |
|  |  |  | 99.92 |

EXAMPLE 1

There were introduced simultaneously into a grinder-mixer:

| | G. |
|---|---|
| Pollucite | 45.5 |
| Powdered silicon of more than 98% purity | 2.0 |
| and | |
| Lime of more than 95% purity | 50.5 |

After grinding, the mixture obtained, in the form of a fine powder, was transferred to a boat of heat-resistant stainless steel and the boat was placed in a heat-resistant stainless steel reactor. The reactor was swept throughout the duration of the reaction with a current of an inert gas, such as argon or nitrogen.

The reactor was heated over ¾ hour to a temperature of about 1300° C. and this temperature was maintained for one hour. The caesium formed was collected as a liquid under liquid petrolatum or paraffin in order to exclude air. 8.6 g. of caesium were obtained, corresponding to a yield of 86%.

EXAMPLE 2

There were introduced simultaneously into a grinder-mixer:

| | G. |
|---|---|
| Pollucite | 45.5 |
| Powdered silicon of more than 98% purity | 3.0 |
| and | |
| Lime of more than 95% purity | 54.4 |

After grinding, the mixture obtained, in the form of a fine powder, was transferred to a boat of heat-resistant stainless steel and the boat was placed in a heat-resistant stainless steel reactor. The atmosphere of the reactor was continuously swept with a stream of several litres/hour of inert gas, such as argon or nitrogen, throughout the duration of the reaction.

The reactor was heated over ¾ hour to a temperature of about 1300° C. and maintained at this temperature for one hour.

The caesium formed was collected as a liquid under liquid petrolatum or paraffin in order to exclude air. There were recovered 9.4 g. of caesium, corresponding to a yield of 94%.

EXAMPLE 3

There were introduced simultaneously into a grinder-mixer:

| | G. |
|---|---|
| Pollucite | 45.5 |
| Powdered silicon of more than 98% purity | 3.0 |
| and | |
| Lime of more than 95% purity | 47.9 |

After grinding, the mixture obtained, in the form of a fine powder, was transferred to a boat of heat-resistant stainless steel and the boat was placed in a heat-resistant stainless steel reactor. The atmosphere of the reactor was continuously swept with a stream of several litres/hour of inert gas, such as argon or nitrogen, throughout the duration of the reaction.

The reactor was heated over a period of 2 hours to a temperature of about 1300° C. and was maintained for 1 hour at this temperature. The caesium formed was collected in liquid form under liquid petrolatum or paraffin in order to exclude air. 9.0 g. of caesium were thus obtained, corresponding to a yield of 90%.

EXAMPLE 4

There were introduced simultaneously into a grinder-mixer:

| | G. |
|---|---|
| Pollucite | 45.5 |
| Powdered silicon of more than 98% purity | 3.0 |
| and | |
| Lime of more than 95% purity | 27.2 |

After grinding, the mixture obtained, in the form of a fine powder, was transferred to a boat of heat-resistant stainless steel and the boat was placed in a heat-resistant stainless steel reactor. The atmosphere of the reactor was continuously swept with a stream of several litres/hour of inert gas, such as argon or nitrogen, throughout the duration of the reaction.

The reactor was heated over ¾ hour to a temperature of about 1300° C. and maintained at this temperature for one hour.

The caesium formed was collected as a liquid under liquid petrolatum or paraffin in order to exclude air. 5.9 g. of caesium were thus obtained, corresponding to a yield of 59%.

EXAMPLE 5

There were introduced simultaneously into a grinder-mixer:

| | G. |
|---|---|
| Pollucite | 45.5 |
| Powdered silicon of more than 98% purity | 3.0 |
| and | |
| Lime of more than 95% purity | 54.4 |

After grinding, the mixture obtained, in the form of a fine powder, was transferred to a boat of heat-resistant stainless steel and the boat was placed in a heat-resistant stainless steel reactor. The atmosphere of the reactor was continuously swept with a stream of several litres/hour of inert gas, such as argon or nitrogen, throughout the duration of the reaction.

The reactor was heated over a period of ¾ hour to a temperature of about 1200° C. and was maintained for one hour at this temperature.

The caesium formed was collected as a liquid under liquid petrolatum or paraffin in order to exclude air. 7.3 g. of caesium were thus obtained, corresponding to a yield of 73%.

EXAMPLE 6

There were introduced simultaneously into a grinder-mixer:

| | G. |
|---|---|
| Pollucite | 45.5 |
| Powdered silicon of more than 98% purity | 3.0 |
| and | |
| Lime of more than 95% purity | 47.9 |

After grinding, the mixture obtained, in the form of a fine powder, was transferred to a boat of heat-resistant stainless steel and the boat was placed in a heat-resistant stainless steel reactor. The atmosphere of the reactor was continuously swept with a stream of several litres/hour of inert gas, such as argon or nitrogen, throughout the duration of the reaction.

The reactor was heated over a period of ¾ hour to a temperature of about 1200° C. and was maintained for 2 hours at this temperature.

The caesium formed was collected as a liquid under liquid petrolatum or paraffin in order to exclude air. 8.8 g. of caesium were thus obtained, corresponding to a yield of 88%.

EXAMPLE 7

There were introduced simultaneously into a grinder-mixer:

| | G. |
|---|---|
| Pollucite | 45.5 |
| Powdered silicon of more than 98% purity | 1.2 |
| and | |
| Lime of more than 95% purity | 46.6 |

After grinding, the mixture obtained, in the form of a fine powder, was transferred to a boat of heat-resistant stainless steel and the boat was placed in a heat-resistant stainless steel reactor. The atmosphere of the reactor was continuously swept with a stream of several litres/hour of inert gas, such as argon or nitrogen, throughout the duration of the reaction.

The reactor was heated over ¾ hour to a temperature of about 1300° C. and maintained at this temperature for one hour.

The caseium formed was collected as a liquid under liquid petrolatum or paraffin in order to exclude air. 5.8 g. of caseium were obtained, corresponding to a yield of 58%.

EXAMPLE 8

There were introduced simultaneously into a grinder-mixer:

|  | G. |
|---|---|
| Pollucite | 45.5 |
| Powdered silicon of more than 98% purity | 3.0 |
| and |  |
| Lime of more than 95% purity | 54.4 |

After grinding, the mixture obtained, in the form of a fine powder, was transferred to a heat-resistant stainless steel boat and the boat was placed in a heat-resistant stainless steel reactor. No particular precautions were taken with regard to the atmosphere of the reactor.

The reactor was heated over ¾ hour to a temperature of about 1300° C. and maintained for one hour at this temperature.

The caesium formed was collected as a liquid under liquid petrolatum or paraffin in order to exclude air. 5.7 g. of caesium were thus obtained, which corresponds to a yield of 57%; this poor yield was due to a non-inert atmosphere being in contact with the reactants.

I claim:

1. A process for the preparation of caesium metal which comprises reacting a caesium-containing mineral with silicon in the presence of lime at a temperature of at least 1200° C., the quantity of silicon used being in excess of the stoichiometric quantity required to reduce the whole of the alkali metal oxides present in the caesium-containing starting material, at least 2 moles of lime (CaO) being used per mole of silica initially present among the reactants and silica formed during the reaction, and the reaction being carried out in an inert gas.

2. A process according to claim 1, in which the caesium-containing starting material is a silico-aluminate known as "pollucite" containing at least 10% by weight of caesium expressed as the oxide.

3. A process according to claim 1, in which the reaction is carried out at a temperature of from 1300 to 1400° C. with continuous sweeping of the reactor with an inert gas throughout the duration of the reaction.

4. A process according to claim 3, in which the inert gas is nitrogen or argon.

5. A process according to claim 1, in which the quantity of silicon used is 5 to 50% in excess of the stoichiometric quantity required to reduce the whole of the alkali metal oxides and the water, if any, present in the starting materials.

6. A process according to claim 1, in which the caesium in the vapour state obtained by the reaction is subjected to fractional condensation in order to recover the metal in the pure state.

References Cited

UNITED STATES PATENTS

| 1,531,623 | 3/1925 | Peacock | 75—66 |
| 1,966,254 | 7/1934 | Marden et al. | 75—66 X |
| 2,424,512 | 7/1947 | Stauffer | 75—66 |
| 2,465,730 | 3/1949 | Kroll | 75—66 |
| 3,207,598 | 9/1965 | Berthold | 75—66 X |
| 3,293,025 | 12/1966 | Jones | 75—66 |
| 3,322,531 | 5/1967 | Tepper | 75—66 |
| 3,392,010 | 7/1968 | Hansley | 75—66 |

OTHER REFERENCES

Hampel: Rare Metals Handbook; 2nd ed., Reinhold Publ. Corp., London, 1961, p. 435.

HENRY W. TARRING II, Prmary Examiner